(12) United States Patent
Pilli et al.

(10) Patent No.: US 11,913,841 B2
(45) Date of Patent: Feb. 27, 2024

(54) ITEM AND A METHOD FOR SENSING AND DISPLAYING TEMPERATURE THEROF

(71) Applicant: Carrier Corporation, Palm Beach Gardens, FL (US)

(72) Inventors: Srinivasa Reddy Pilli, Telangana (IN); Vinay Kumar Vinnakota, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 529 days.

(21) Appl. No.: 17/116,495

(22) Filed: Dec. 9, 2020

(65) Prior Publication Data
US 2021/0247237 A1 Aug. 12, 2021

(30) Foreign Application Priority Data
Feb. 7, 2020 (IN) .............................. 202011005428

(51) Int. Cl.
  *G01K 1/14* (2021.01)
  *G01K 1/02* (2021.01)
  *G01K 3/00* (2006.01)
  *G01K 7/18* (2006.01)

(52) U.S. Cl.
  CPC ............... *G01K 1/14* (2013.01); *G01K 1/02* (2013.01); *G01K 3/005* (2013.01); *G01K 7/183* (2013.01)

(58) Field of Classification Search
  CPC ............ G01K 1/14; G01K 1/02; G01K 3/005; G01K 7/183
  See application file for complete search history.

(56) References Cited

U.S. PATENT DOCUMENTS

| 4,257,683 | A | 3/1981 | Kuwagaki et al. |
| 5,749,656 | A | 5/1998 | Boehm et al. |
| 8,215,835 | B2 | 7/2012 | Hyde et al. |
| 2003/0127416 | A1* | 7/2003 | Salazar-Leal ........ B65D 51/245 215/230 |
| 2008/0184927 | A1* | 8/2008 | Pham ..................... G01K 11/12 374/E11.018 |
| 2014/0136430 | A1 | 5/2014 | Pope |
| 2015/0187234 | A1 | 7/2015 | Atkinson et al. |

(Continued)

FOREIGN PATENT DOCUMENTS

| CN | 110300716 A | * | 10/2019 | ............. B65D 41/04 |
| DE | 202021106105 U1 | * | 1/2022 | |
| EP | 1921018 A1 | * | 5/2008 | ............. B65D 41/58 |

OTHER PUBLICATIONS

European Search Report for Application No. 20213598.4; dated Jun. 8, 2021; 8 Pages.

*Primary Examiner* — Mirellys Jagan
(74) *Attorney, Agent, or Firm* — CANTOR COLBURN LLP

(57) ABSTRACT

Aspects of the invention are directed towards a system and a method for sensing temperature of an item and displaying temperature thereof. One or more embodiments of the invention describe the method comprising steps of sensing, by a metal crimp coupled with a sensor, a temperature of content inside an item and determine a value of the temperature. The method further describes step of displaying an indication of the temperature value on an electrochromic strip coupled with the sensor.

16 Claims, 7 Drawing Sheets

(56) References Cited

U.S. PATENT DOCUMENTS

| | | | |
|---|---|---|---|
| 2016/0069271 A1* | 3/2016 | Shinkle | F23R 3/346 60/776 |
| 2017/0352002 A1 | 12/2017 | Lam | |
| 2018/0144596 A1 | 5/2018 | Squatrito | |
| 2019/0323456 A1 | 10/2019 | Hruza et al. | |
| 2019/0390890 A1 | 12/2019 | Alexander et al. | |

* cited by examiner

102

102

ITEM AND A METHOD FOR SENSING AND DISPLAYING TEMPERATURE THEROF

CROSS-REFERENCE TO RELATED APPLICATIONS

This application claims priority to Indian Patent Application No. 202011005428, filed Feb. 7, 2020, the contents of which are incorporated by reference herein in their entirety.

BACKGROUND

The present invention generally relates to items. More particularly, the invention relates to sensing temperature inside an item.

A variety of goods are packaged and transported from one place to another, both over short and long distances. The goods may be in the form of one or more items having contents therein. Some contents may be sensitive to environmental factors such as temperature, humidity, pressure etc. Manufacturers of items with sensitive content may define a specific threshold or a limit for maintaining a particular range of temperature in order to keep the contents of the items fresh or prevent them from becoming stale/unusable. A variation in temperature beyond the stipulated limit may cause adverse effects on the contents of the items during transportation or even if they are kept in a storage. Such effects could be a change in the chemical composition, or discoloration or a general degradation of the content which may render them non-consumable/unusable for end consumers. However, when the item reaches the end consumers, the consumers will be oblivious to such changes as there is no way to communicate changes to them.

Existing solutions in the market monitor only environmental/outside temperature of these items i.e. the temperature at which these items are kept and do not monitor the temperature inside the items where the content resides. In absence of knowledge about the actual temperature inside the item, the end consumer as well as the manufacturers of items would not be able to take any necessary measure to protect the contents inside the item.

In view of the afore-mentioned problems in the existing solutions, there is a need of an effective solution for sensing temperature inside an item. There is also a requirement of an effective solution for informing an end consumer regarding the temperature inside the item. In order to solve the problems in the existing solutions, an item and a method are disclosed.

SUMMARY

Various embodiments of the invention describe an item for sensing temperature inside an item and displaying an indication of the temperature thereof. The item comprises a metal crimp coupled with a sensor adapted to sense a temperature of content inside the item and determine a value of the temperature. The item comprises an electrochromic strip coupled with the sensor and adapted to display an indication of the temperature value.

In an embodiment of the invention, the item further comprises a processor communicably coupled with the sensor. Also, the sensor is adapted to transmit the temperature value to the processor.

In a different embodiment of the invention, the processor further validates the temperature value by comparing the temperature value with a pre-defined temperature range.

In another embodiment of the invention, the processor transmits the validation to a server for generating an alert for a manufacturer and/or a user when the temperature value does not fall within the pre-defined temperature range.

In yet another embodiment of the invention, the sensor communicates with a thermostat for controlling the temperature.

In yet another embodiment of the invention, the electrochromic strip for displaying the indication corresponds to a reversible electrochromic strip In still another embodiment of the invention, the indication of the temperature value is displayed on the electrochromic strip using different colors for a user of the item. Also, the indication of the temperature value with a red color displayed on the electrochromic strip informs the user that content inside the item is unfit for consumption.

In a different embodiment of the invention, the metal crimp coupled with the item is an aluminum crimp.

In an embodiment of the invention, the sensor communicably coupled with the metal crimp corresponds to a resistance temperature detector (RTD) or a platinum resistance thermometer (PRT).

In another embodiment of the invention, the item is coupled with an irreversible thermochromics paper to sense and indicate a temperature of the item. Also, the irreversible thermo-chromic paper is placed at bottom of the item.

Various embodiments of the invention describe a method for sensing temperature inside an item and displaying an indication of the temperature thereof. The method comprises step of sensing, by a metal crimp coupled with a sensor, a temperature of content inside an item and determine a value of the temperature. The method further comprises step of displaying an indication of the temperature value on an electrochromic strip coupled with the sensor.

In an embodiment of the invention, the item further comprises a processor communicably coupled with the sensor. Also, the sensor transmits the temperature value to the processor.

In a different embodiment of the invention, the processor further validates the temperature value by comparing the temperature value with a pre-defined temperature range.

In an embodiment of the invention, the processor transmits the validation to a server for generating an alert for a manufacturer and/or a user when the temperature value does not fall within the pre-defined temperature range.

In yet another embodiment of the invention, the electrochromic strip for displaying the indication corresponds to a reversible electrochromic strip.

In another embodiment of the invention, the indication of the temperature value is displayed on the electrochromic strip using different colors for a user of the item. Also, the indication of the temperature value with a red color displayed on the electrochromic strip informs the user that content inside the item is unfit for consumption.

In an embodiment of the invention, the metal crimp coupled with the item is an aluminum crimp.

In another different embodiment of the invention, a computer readable medium is disclosed for sensing temperature inside an item and displaying an indication of the temperature thereof. The computer readable medium comprises one or more processors and a memory is coupled to the one or more processors, the memory stores instructions executed by the one or more processors. The one or more processors are configured to sense, by a metal crimp coupled with a sensor, a temperature of content inside an item and determine a value of the temperature. The one or more processors are further configured to display an indication of the temperature value on an electrochromic strip coupled with the sensor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention. The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

Corresponding reference numerals indicate corresponding parts throughout the drawings.

DETAILED DESCRIPTION

Described herein is the technology with an item and a method for sensing temperature inside an item and displaying an indication of the temperature thereof. A metal strip may be coupled with a sensor to sense temperature of present content present inside an item. Also, the metal strip and the sensor may be associated with the item. In an exemplary embodiment, the metal strip may be an aluminum strip.

Based on sensing of the temperature of content present inside the item, the sensor may determine a value of the temperature. Further, the sensor may also be coupled with an electrochromic strip that may display an indication of the temperature value determined by the sensor. Such an indication would inform a user of the item if the content present inside the item is fit for consumption or not.

As used herein, the item may comprise various components which have been described below in greater details. Also, the item may be placed in a container or in a room and may also communicate with a server through a network. The item may include content for consumption or usage by a user. Such item may be a bottle or a box having liquid content, solid content or semi solid content or any such item known in the art. The content in the item may be for any kind of consumption/usage and may be a pharmaceutical content, a liquid content, an eatable content, a lotion, a cream, tablets or any such content known in the art.

As used herein, the sensor may be coupled with the metal crimp. Also, the sensor may correspond to a resistance temperature detector (RTD) or a platinum resistance thermometer (PRT). The sensor may also have capability to communicate with a thermostat that may control the temperature based on the temperature value determined by the sensor.

As used herein, the server has processing capabilities as disclosed further in the specification. The server may be a cloud storage, a remote database, or any such storage known in the art.

As used herein, the network may refer to a wired network, a mesh network, a cellular network (such as Global System for Mobile (GSM) network, a Long-Term Evolution (LTE) network, a code-division multiple access (CDMA) network, a narrow-band internet of thing (NB-IoT) technique or category M1 technique)), a short-range network (a Wi-Fi network, a ZigBee network, a Bluetooth network, or a Near-Field Communication technique) or any such network/technique that is known in the art.

Figure 1A:
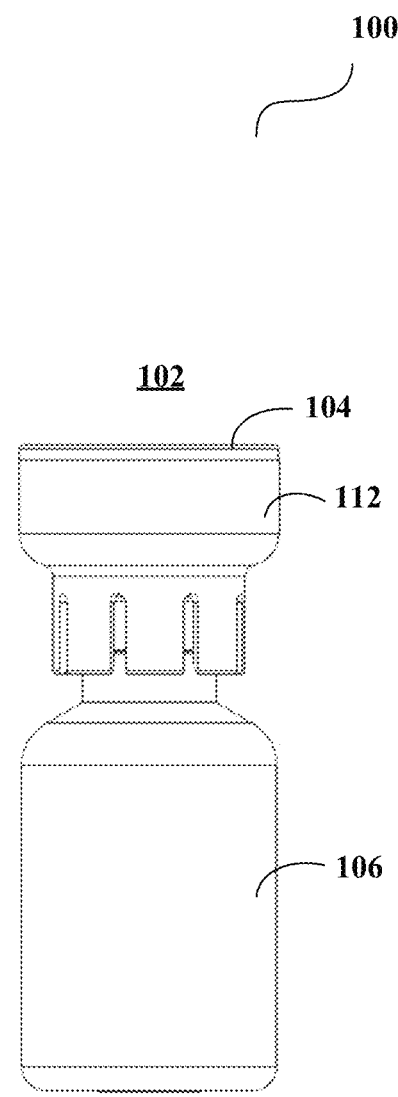
FIG. 1A depicts an assembled view of an exemplary item and FIG. 1B depicts an exploded view of an exemplary item according to an exemplary embodiment of the invention.

FIG. 1A depicts an assembled view of an exemplary item according to an exemplary embodiment of the invention. As can be seen in the assembled view 100A, an item 102 may comprise a cap 104 and a body 106. The cap 104 may be positioned on an upper or top portion of the item 102. The cap 104 and housing 112 may be used to lock the item 102 by rotating the cap 104 and housing 112 on the body 106 in a clockwise direction and may be unlocked when the cap 104 and housing 112 is rotated in an anti-clockwise direction. Also, the cap 104 and the housing 112 may be a snap fit to lock the item 102 and may be unlocked when the cap 104 as well as the housing 112 are pulled out in opposite direction. In an exemplary embodiment, the cap 104 and the housing 112 may be considered as a single component and as part of a tracking device assembly. The tracking device assembly (not shown) of the item 102 may be used to track location of the item 102 during transit and may also monitor external temperature of the item 102. The tracking device assembly may be detached from the item 102 once the item 102 is administered to a user. Further, the body 106 may have content that may be consumed/used by any user of the item 102.

Figure 1B:
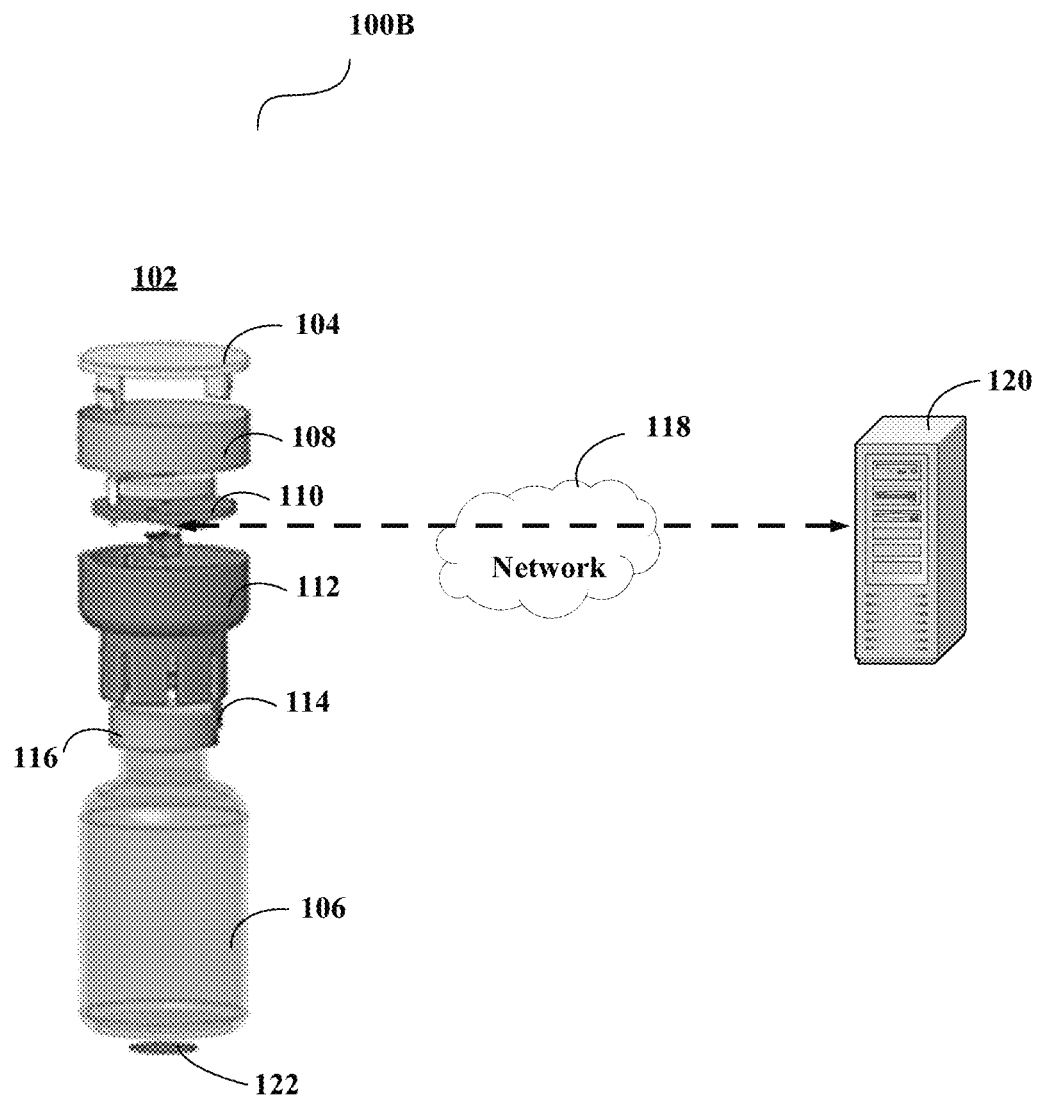

FIG. 1B depicts an exploded view of an exemplary item according to an exemplary embodiment of the invention. As depicted in the exploded view 100B, the item 102 may further comprise, but is not limited to, an electrochromic strip 108, a cap 104, a processor 110, a sensor 114, a metal crimp 116, and/or a thermochromics paper strip 122. The housing 112 may provide enclosure to the sensor 114 and/or the processor 110.

As can be seen, the metal crimp 116 may be wrapped around neck of the body 106 or may be wrapped inside the neck of the body 106 of the item 102. Wrapping the metal crimp 116 around neck of the body 106 may position the metal crimp 116 in such a way that the metal crimp 116 stays near to the content present inside the body 106 of the item 102. Also can be seen in FIG. 1B, the metal crimp 116 may be coupled with the sensor 114 of the item 102. In this way, the metal crimp 116 coupled with the sensor 114 may be adapted to sense temperature of the content present inside the item 102 as the temperature or energy of the content will also get transferred to the metal crimp 116. Since both the metal crimp 116 and the content are in very close proximity, temperature of the content inside the item 102 may be nearly similar to the temperature of the metal crimp 116. In other words, the metal crimp 116 may be equally warm as the content will be inside the body 106 of the item 102. Alternatively, the metal crimp 116 may also be as cold as the content will be inside the body 106 of the item 102. This embodiment of the present invention provides a technical advantage of using effective and accurate temperature of content inside an item for taking appropriate measures.

Further, as can be seen in FIG. 1B, the sensor 114 may be coupled with the metal crimp 116. This would enable the sensor 114 to sense the temperature of content through the metal crimp 116. Based on the sensing of the temperature of content through the metal crimp 116, the sensor 114 may be adapted to determine a value of the temperature provided by the metal crimp 116. For an instance, the value of the temperature determined by the sensor 114 is 10° Celsius. The sensor 114 along with the processor 110 or the sensor 114 alone may determine if the value of the temperature falls within or outside a pre-defined temperature range. In an exemplary embodiment, the sensor 114 may correspond to a resistance temperature detector (RTD) or a platinum resistance thermometer (PRT) that is known in the art.

Furthermore, the sensor 114 may also be communicably coupled with the electrochromic strip 108 of the item 102 so that the sensor 114 may communicate the temperature value to the electrochromic strip 108 to display a pre-defined color after administered or reaching the end user. For a range of temperature, a pre-defined color may be selected and enabled in the electrochromic strip 108. For an instance, if the value of the temperature falls within a pre-defined temperature range, then such an indication may be displayed on the electrochromic strip 108 using green color. And, if the value of the temperature falls outside a pre-defined temperature range, then such an indication may be displayed on the electrochromic strip 108 using red color. This has been explained in greater details in FIG. 1C. In order to display indication, the electrochromic strip 108 may take power/charge from a battery of the item 102. In an exemplary embodiment, the electrochromic strip 108 for displaying the indication may correspond to a reversible electrochromic strip. The electrochromic strip 108 may be reversible as the electrochromic strip 108 along with the tracking device assembly may be returned back to a manufacturer of the item 102 or a manufacturer of the content inside the item 102 after the item 102 is administered to the user of the item 102. Accordingly, the electrochromic strip 108 may be adapted to display an indication of the temperature value as communicated by the sensor 114. Moreover, the indication of the temperature value may be displayed on the electrochromic strip 108 using different colors for a user of the item 102. Along with the electrochromic strip 108, the item 102 may further comprise the thermochromics paper strip 122 placed at bottom of the item 102 as shown in the FIG. 1B. The thermochromics paper strip 122 has been explained below in greater details.

Figure 1C:
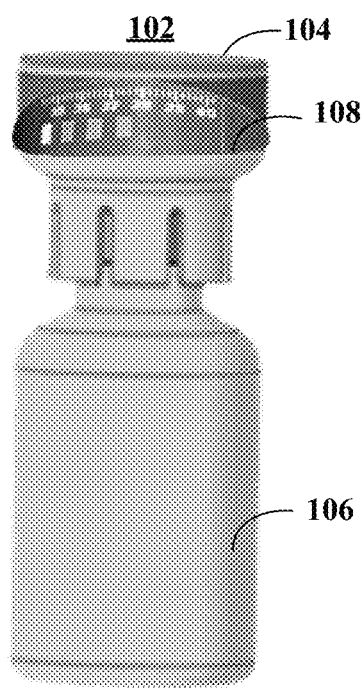
FIG. 1C depicts an electrochromic strip of an exemplary item.

FIG. 1C depicts an electrochromic strip of an exemplary item according to an exemplary embodiment of the invention. As can be seen in FIG. 1C, the electrochromic strip 108 may have various indicators for the user. Various indicators have been explained with examples herein. In an exemplary first embodiment, if the temperature value is or above a first pre-defined temperature threshold (may be 25° Celsius), then, the indication of the temperature value with red color may be displayed on the electrochromic strip 108. The red color may inform a user of the item 102 that content inside the item 102 is unfit for consumption. In an exemplary second embodiment, if the temperature value is below a second pre-defined temperature threshold (may be 8° Celsius), then, the indication of the temperature value with green color may be displayed on the electrochromic strip 108. The green color may inform the user of the item 102 that content inside the item 102 is fit for consumption. In an exemplary third embodiment, yellow color may also be displayed on the electrochromic strip 108 when the tracking device assembly is used and thereby, detached from the item 102 after the content inside item 102 is administered to the user. Then, the tracking device assembly may be returned back to the manufacturer of the item 102 or the manufacturer of the content inside the item 102. The yellow color indication on the electrochromic strip 108 will give information to the manufacturer of the content/item 102 for separating out "used" vs "new" tracking devices assembly. Further, the electrochromic strip 108 may indicate yellow color once a switch in the tracking device assembly gets un-pressed. If the switch is pressed, then this means that the item 102 is still unused and still attached to tracking device assembly.

Figure 1D:
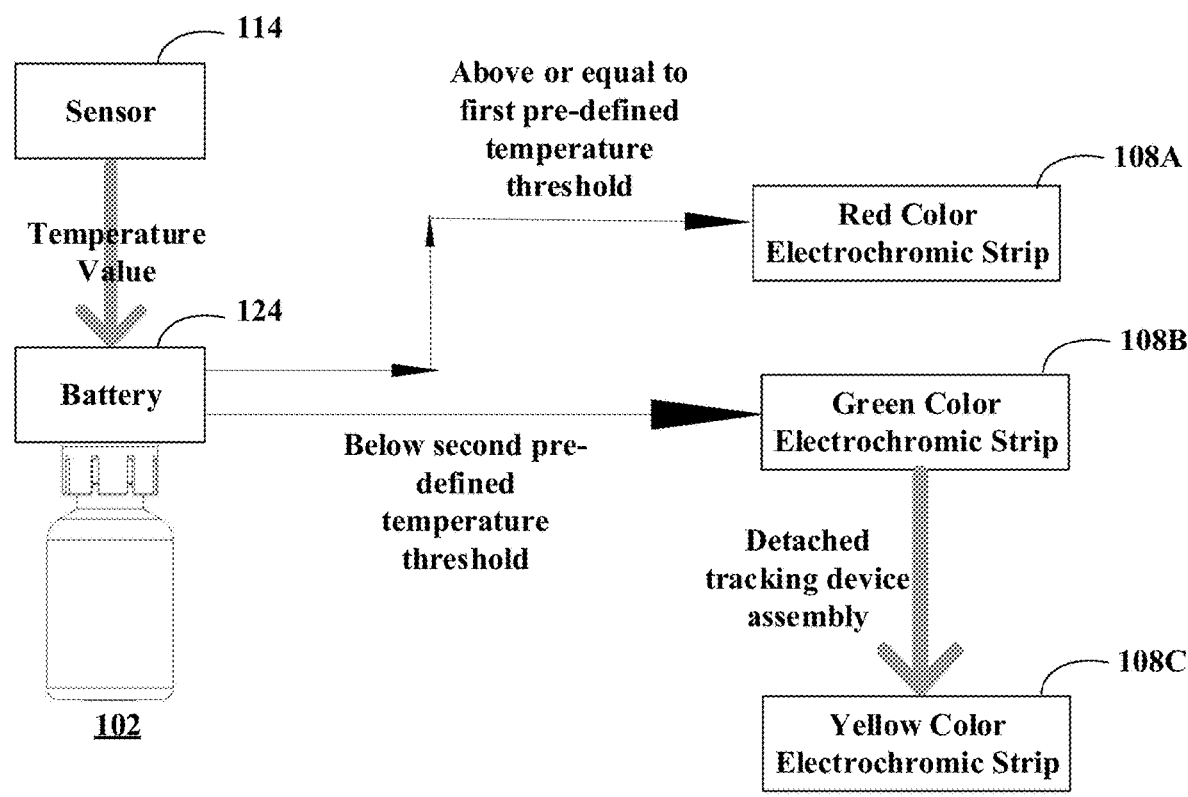
FIG. 1D depicts various colors of electrochromic strips of an exemplary item.

FIG. 1D depicts various colors of electrochromic strips of an exemplary item according to an exemplary embodiment of the invention. As can be seen, the electrochromic strip 108 may comprise three different layers of electrochromic strips i.e. a red color electrochromic strip 108A, a yellow color electrochromic strip 108C and a green color electrochromic strip 108B for providing indication to the user. Based on the temperature value provided by the sensor 114, the power/charge from a battery 124 of the item 102 flows to a respective layer of the electrochromic strip. Such layers of the electrochromic strips are not more than 0.3 milli-meter (mm) (may be of 0.1 mm each and have protective coating). For an instance, if the sensor 114 provides the temperature value feedback to show green color when the temperature value is below the second pre-defined temperature threshold then 1-2 volts of powers may be given to the green color layer of the electrochromic strip 108B. Similarly, if the sensor 114 provides the temperature value feedback to show red color when the temperature value is above or equal to the first pre-defined temperature threshold then 1-2 volts of powers may be given to the red color layer of the electrochromic strip 108A. And, after if the item 102 is unplugged from the tracking device assembly, then data from the switch is sent as a feedback to the yellow color layer of the electrochromic strip 108C, where the charge or power supplied to green or red color layers of electrochromic strips 108A-108B is discharged and supplied to the yellow color layer 108C.

The present invention also encompasses the item 102 further comprising an irreversible thermochromics paper strip 122. The thermochromics paper strip 122 may be placed at the bottom of the item 102. Placing the thermochromics paper strip 122 on the bottom of the item 102 would enable the thermochromics paper strip 122 to sense temperature of the item 102 through the body of the item 102 during the transit until the content inside the item 102 is administered/consumed by the user. Also, the thermochromics paper strip 122 is always placed at the bottom of the item 102 to restrict any kind of human touch interaction with thermochromics paper strip 122. By not restricting the human touch interaction on the thermochromics paper strip 122, the body temperature of the human may be reflected on the thermochromics paper strip 122 through red color indication which would create adverse effects and thus, provide wrong temperature indication. Specifically, the thermochromics paper strip 122 may have such properties (or material) to sense the temperature of the body 106 of the item 102. Further, the thermochromics paper strip 122 may be an irreversible thermo-chromic paper strip 122 as the thermochromic paper strip 122 would remain attached to the item 102 even after the item 102 is administered to the user. And thus, the thermochromics paper strip 122 would not be returned back (unlike the electrochromic strip 108) to the manufacturer of the item or the manufacturer of the content inside the item 102. This would enable the thermochromics paper strip 122 to continue sensing and indicating the temperature of the item 102 to the user even after the electrochromic strip 108 is returned back to the manufacturer. The independent sensing and displaying temperature by the electrochromic strip 108 and the thermochromics paper strip 122 on the item 102 would provide a technical advantage of providing alternative mistake proofing immediate solution to inform the user about the health of content inside the item 102 even if one of these strips do not work or fails to indicate. The visual indication provides confidence to the end user for consumption of the content.

Moreover, the thermochromics paper strip 122 may sense and indicate sensed temperature to the user in different colors like the electrochromic strip 108 does (as explained above). In specific, the thermochromics paper strip 122 may change its color by sensing the temperature of the item 102. In an exemplary embodiment, the electrochromic strip 108 and the thermochromics paper strip 122 may show same color at a time as both strips are sensing the temperature of the item 102. The property of sensing and indicating the temperature by the thermochromics paper strip is already known in the art. The thermochromics paper strip 122 may have another various indicator for the user of the item 102. In an exemplary embodiment, if temperature sensed by the thermochromics paper strip 122 is or above a first pre-defined temperature threshold (may be 25° Celsius), then, the indication of the temperature with red color may be displayed on the thermochromics paper strip 122. The red color may inform a user of the item 102 that content inside the item 102 is unfit for consumption. In an exemplary second embodiment, if the temperature sensed by the thermochromics paper strip 122 is below a second pre-defined temperature threshold (may be 8° Celsius), then, the indication of the temperature with green color may be displayed on the thermochromics paper strip 122. The green color may inform the user of the item 102 that content inside the item 102 is fit for consumption. If anytime during transit or at any location, the temperature measured by the thermochromics paper strip 122 reaches above the first pre-defined temperature threshold (i.e. 25° Celsius), then, the red color indication will remain on the thermochromics paper strip 122 even if the item 102 is maintained at a desired temperature later on. In other words, once the item 102 is kept in an unsuitable environment (i.e. above the first pre-defined temperature threshold, then the indication with the red color would not get changed.

As used herein, the first pre-defined temperature threshold and/or the second pre-defined temperature threshold may be defined by a manufacturer of the content inside the item 102. The above-mentioned embodiments of the present invention provide a technical advantage of informing a user of an item about content present inside the item before using/consuming the item. The above-mentioned embodiments of the present invention provide another technical advantage of enabling the user to decide for either accepting or rejecting the item 102. Although the present invention describes the indication of the temperature value on the electrochromic strip 108 and the thermochromics paper using three colors (red, yellow and green); however, it is understood by the person skilled in the art that any other form of indication of the temperature value on the electrochromic strip 108 is within the scope of the present invention.

Moreover, the sensor 114 may also be communicably coupled with the processor 110 of the item 102 so that the sensor 114 may transmit the temperature value to the processor 110. The processor 110 may be adapted to receive the temperature value and may validate the temperature value by comparing the temperature value with a pre-defined temperature range (such as the first pre-defined temperature threshold and the second pre-defined temperature threshold as described above). Also, when the processor 110 determines that the temperature value does not fall within the pre-defined temperature range based on the validation, the processor 110 may generate and transmit an alert to a server 120 through a communication unit (may be a transceiver) of the item 102 using a network 118. In an exemplary embodiment, the processor 110 may generate and transmit the alert when the temperature value is or above the first pre-defined temperature threshold as explained above.

When the server 120 receives the alert, the server 120 may be adapted to transmit such an alert to a user of the item 102 and/or a manufacturer of the item that the content inside the item 102 has become unfit for consumption. Alternatively, the sensor 114 may be communicably coupled with the server 120 so that the sensor 114 may directly transmit the temperature value to the server 120. Then, the server 120 may be adapted to receive the temperature value and may validate the temperature value as explained above.

The present invention encompasses the sensor 114 to communicate with a thermostat (not shown) for controlling the temperature inside a container or a room where the item 102 is placed inside the container or the room. The thermostat may be responsible to maintain a particular temperature inside the container/room so that the content inside the item does not get stale/unfit. When the thermostat receives the temperature value from the sensor 114, the thermostat may accordingly control the temperature inside the container/room.

Figure 1E:
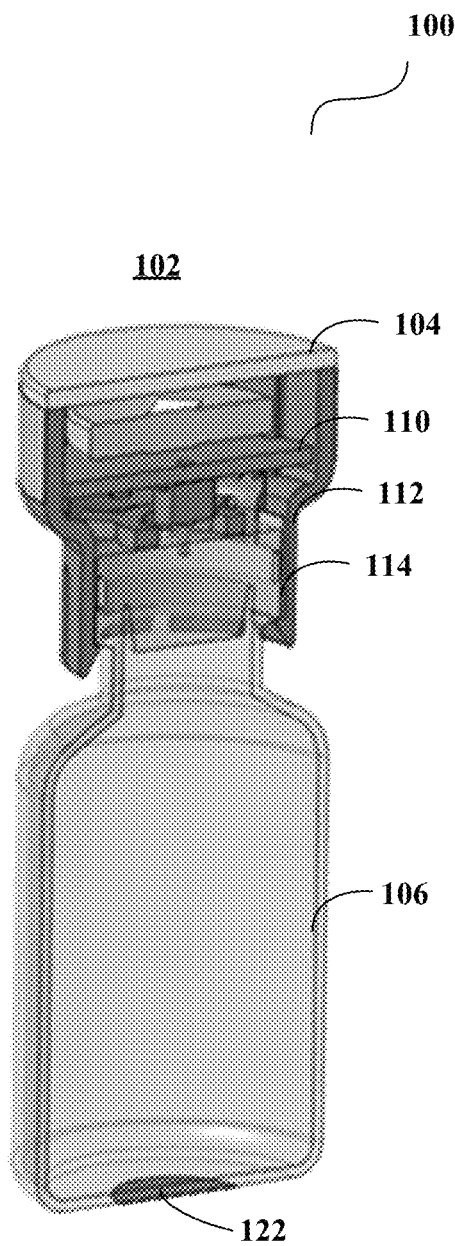
FIG. 1E depicts a cross-sectional view of an exemplary item.
Figure 1F:
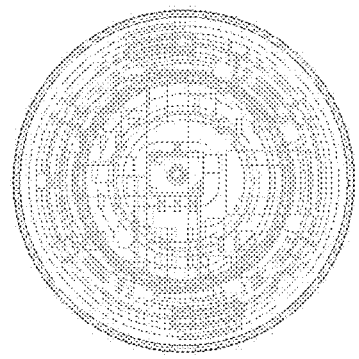
FIG. 1F depicts a top view of an exemplary item.
Figure 1G:
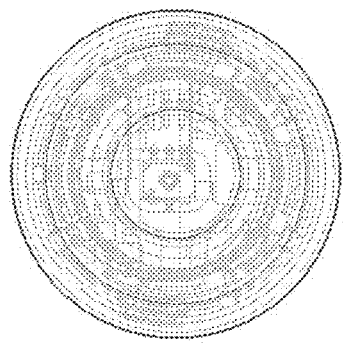
FIG. 1G depicts a bottom view of an exemplary item according to an exemplary embodiment of the invention.

FIG. 1E depicts a cross-sectional view of an exemplary item 102 according to an exemplary embodiment of the invention. As can be seen in the cross-sectional view 100E of the item 102, the cap 104 is there and then the processor 110 is also present. Also shown are the sensor 114 of the item 102 and the body 106 of the item. FIG. 1F depicts a top view of an exemplary item 102 and FIG. 1G depicts a bottom view of an exemplary item 102 according to an exemplary embodiment of the invention.

Figure 2:
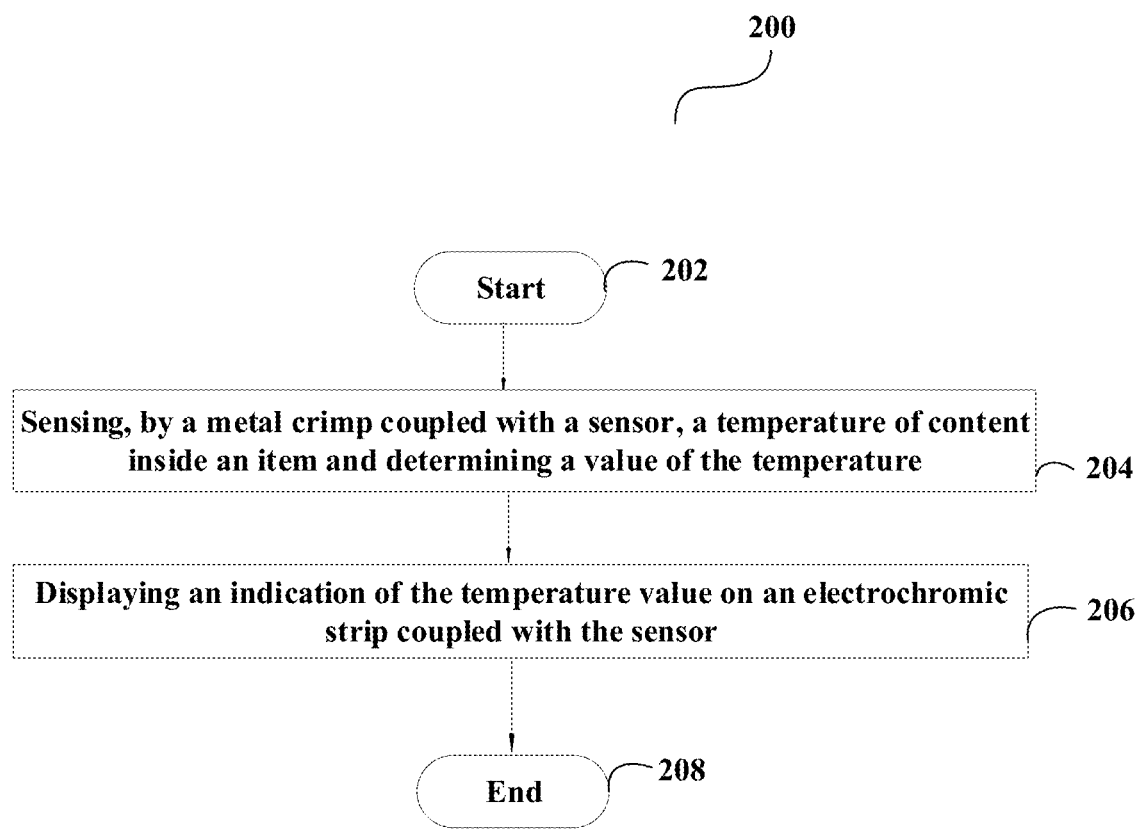
FIG. 2 depicts an exemplary flowchart illustrating a method to perform the invention according to an exemplary embodiment of the invention.

FIG. 2 depicts a flowchart outlining the features of the invention in an exemplary embodiment of the invention. The method flowchart 200 describes a method being for sensing temperature inside an item and displaying an indication of the temperature thereof. The method flowchart 200 starts at step 202.

At step 204, a metal crimp 116 coupled with a sensor 114 may sense temperature of content inside an item 102 and may also determine a value of the temperature through the metal crimp 116. This has been discussed above in greater details.

At step 206, an electrochromic strip 108 coupled with the sensor 114 may display an indication of the temperature value. This has been discussed above in greater details. Then, the method flowchart 200 may end at 208.

The present invention is applicable in various fields such as, but not limited to, pharmaceutical industry, cosmetics industry, food industry and any such industry producing environmentally sensitive content and is well known in the art.

In one embodiment of the invention, the invention can be operated using the one or more computer readable devices. The one or more computer readable devices can be associated with an item 102. A computer readable medium comprises one or more processors and a memory coupled to the one or more processors, the memory stores instructions executed by the one or more processors. The one or more processors configured to sense, by a metal crimp 116 coupled with a sensor 114, a temperature of content inside an item 102 and determine a value of the temperature. The one or more processors configured to display an indication of the temperature value on an electrochromic strip 108 coupled with the sensor 114.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit Nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An item comprising:
   a metal crimp secured to the item and coupled with a sensor adapted to sense a temperature of a content inside the item and determine a value of the temperature; and
   an electrochromic strip coupled with the sensor and adapted to display an indication of the temperature value in response to the value of the temperature sensed by the sensor;
   wherein the item further comprises a processor communicably coupled with the sensor, wherein the sensor is adapted to transmit the temperature value to the processor; and
   wherein the processor further validates the temperature value by comparing the temperature value with a pre-defined temperature range.

2. The item of claim 1, wherein the processor transmits the validation to a server for generating an alert for a manufacturer and/or a user when the temperature value does not fall within the pre-defined temperature range.

3. The item of claim 1, wherein the sensor communicates with a thermostat for controlling the temperature.

4. The item of claim 1, wherein the electrochromic strip for displaying the indication corresponds to a reversible electrochromic strip.

5. The item of claim 1, wherein the metal crimp is an aluminum crimp.

6. The item of claim 1, wherein the sensor comprises a resistance temperature detector (RTD) or a platinum resistance thermometer (PRT).

7. The item of claim 1, wherein the item is coupled with an irreversible thermochromics paper to sense and indicate a temperature of the item, wherein the irreversible thermochromics paper is placed at bottom of the item.

8. The item of claim 1, wherein the indication of the temperature value is displayed on the electrochromic strip using different colors.

9. The item of claim 8, wherein the indication of the temperature value with a red color displayed on the electrochromic strip informs the user that the content inside the item is unfit for consumption.

10. A method comprising:
    sensing, by a metal crimp secured to an item and coupled with a sensor, a temperature of a content inside an item and determine a value of the temperature; and
    displaying an indication of the temperature value on an electrochromic strip coupled with the sensor in response to the value of the temperature sensed by the sensor;
    wherein the item further comprises a processor communicably coupled with the sensor, wherein the sensor transmits the temperature value to the processor; and
    wherein the processor further validates the temperature value by comparing the temperature value with a pre-defined temperature range.

11. The method of claim 10, wherein the processor transmits the validation to a server for generating an alert for a manufacturer and/or a user when the temperature value does not fall within the pre-defined temperature range.

12. The method of claim 10, wherein the electrochromic strip for displaying the indication corresponds to a reversible electrochromic strip.

13. The method of claim 10, wherein the metal crimp is an aluminum crimp.

14. The method of claim 10, wherein the indication of the temperature value is displayed on the electrochromic strip using different colors.

15. The method of claim 14, wherein the indication of the temperature value with a red color displayed on the electrochromic strip informs the user that the content inside the item is unfit for consumption.

16. A computer readable medium comprising one or more processors and a memory coupled to the one or more processors, the memory storing instructions executed by the one or more processors, the one or more processors configured to:
    sense, by a metal crimp secured to the item and coupled with a sensor, a temperature of a content inside an item and determine a value of the temperature; and
    display an indication of the temperature value on an electrochromic strip coupled with the sensor in response to the value of the temperature sensed by the sensor;
    wherein the item further comprises a processor communicably coupled with the sensor, wherein the sensor transmits the temperature value to the processor; and
    wherein the processor further validates the temperature value by comparing the temperature value with a pre-defined temperature range.

* * * * *